United States Patent [19]
Kinney

[11] 3,792,566
[45] Feb. 19, 1974

[54] CLOSURE APPLYING APPARATUS
[75] Inventor: Alfred W. Kinney, Kansas City, Mo.
[73] Assignee: Phillips Petroleum Company, Bartlesville, Okla.
[22] Filed: May 30, 1972
[21] Appl. No.: 257,820

[52] U.S. Cl. .................................. 53/298, 53/329
[51] Int. Cl. ............................................ B67b 3/04
[58] Field of Search ..... 53/296, 298, 389, 329, 342, 53/379, 297, 333, 334, 300

[56] References Cited
UNITED STATES PATENTS

| | | | |
|---|---|---|---|
| 2,825,194 | 3/1958 | Page | 53/296 UX |
| 3,243,934 | 4/1966 | Kinney | 53/296 X |
| 3,714,755 | 2/1973 | Phalin et al. | 53/300 X |
| 3,703,066 | 11/1972 | Marion et al. | 53/296 |
| 3,112,587 | 12/1963 | Anderson et al. | 53/296 X |
| 3,163,973 | 1/1965 | St. Clair | 53/329 |
| 3,354,614 | 11/1967 | St. Clair | 53/329 X |
| 3,590,554 | 7/1971 | Carter | 53/329 X |
| 741,249 | 10/1903 | Jovignot | 53/334 |

Primary Examiner—Travis S. McGehee
Assistant Examiner—Horace M. Culver

[57] ABSTRACT

Apparatus for closing an open-ended container in which a shearing mechanism which shears a film positioned above the container retains and moves the sheared film into contact with the rim of the container where it is formed into sealing relationship with the container to close it.

9 Claims, 4 Drawing Figures

CLOSURE APPLYING APPARATUS

This invention relates to closure applying apparatus.

In one of its more specific aspects, this invention relates to a method and to apparatus for applying film closures to containers.

The use of film closures for containers is well known. Such closures are generally formed of a polymer film and are adapted to be maintained in friction contact with a rolled rim, brim or flange extending outwardly from the container opening around its periphery. Such closures frequently serve as a secondary, easily replaceable closure which is employed after a hermetically-sealing closure is removed from the container.

The present invention concerns such closures and provides apparatus for applying such closures to a container and avoid problems attendant to separation of the sealed closure combination from the film web after the sealing has taken place.

According to this invention there is provided a method and apparatus for applying a removable closure in closing relationship to a container which involves positioning a film at a predetermined position over the container and fixing the film in that position. The film is then sheared to the desired size and configuration and transferred into contact with the container where it is removably positioned in contact with the container to close the container.

While a variety of means can be supplied to perform the various functions of positioning the film over the open-ended container to be closed, shearing the film and bringing it into contact with the open end of the container employing the shearing means, forming means for forming the sheared film in closing relationship to the container to close it and means for removing the closed container from the apparatus, the invention will be explained herein in terms of its best mode and to certain detailed means without meaning to limit the invention thereto.

This invention is applicable to containers of any size or shape which are adapted to be closed by a film which is preferably brought into engagement with a rim projecting outwardly around the periphery of the container. The closure can be maintained in contact by friction with the container or by sealing thereto.

The invention can be practiced employing a web of any suitable material which can be sheared and shaped. Preferably, such material will comprise a transparent polymeric film through which the contents of the container can be seen when the closure is in place.

The method of this invention will be more easily understood if explained in conjunction with the attached drawings in which FIG. 1 is an elevational view of the apparatus of this invention;

Figure 1:
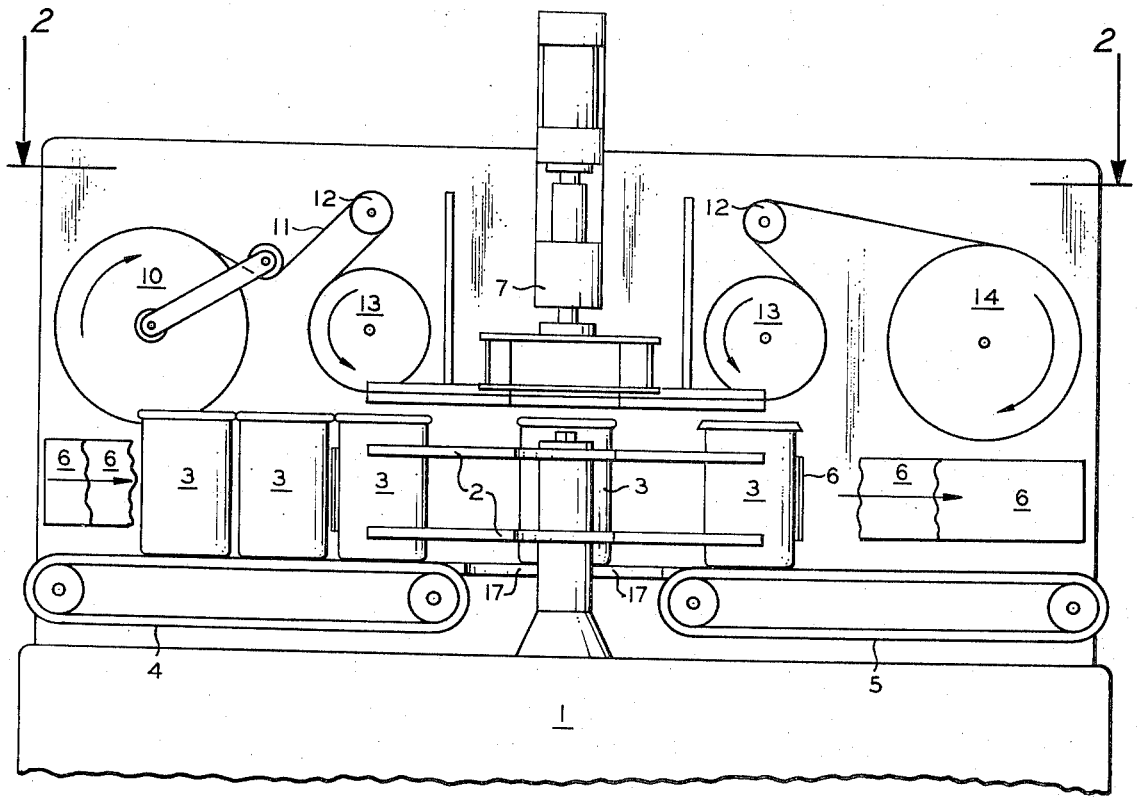

Referring now to FIG. 1, there is shown the apparatus of this invention in which a rotary type feed unit is employed. The apparatus is adapted with base 1 on which there is mounted a turret 2 adapted to carry any number of containers 3 which are fed in the opened condition to the apparatus on in-feed conveyor 4 and which are recovered in the closed condition by take-off conveyor 5. The turret is adapted with retainer plate 6 and support plate 17 to facilitate the retention of the containers on the turret.

Figure 3:
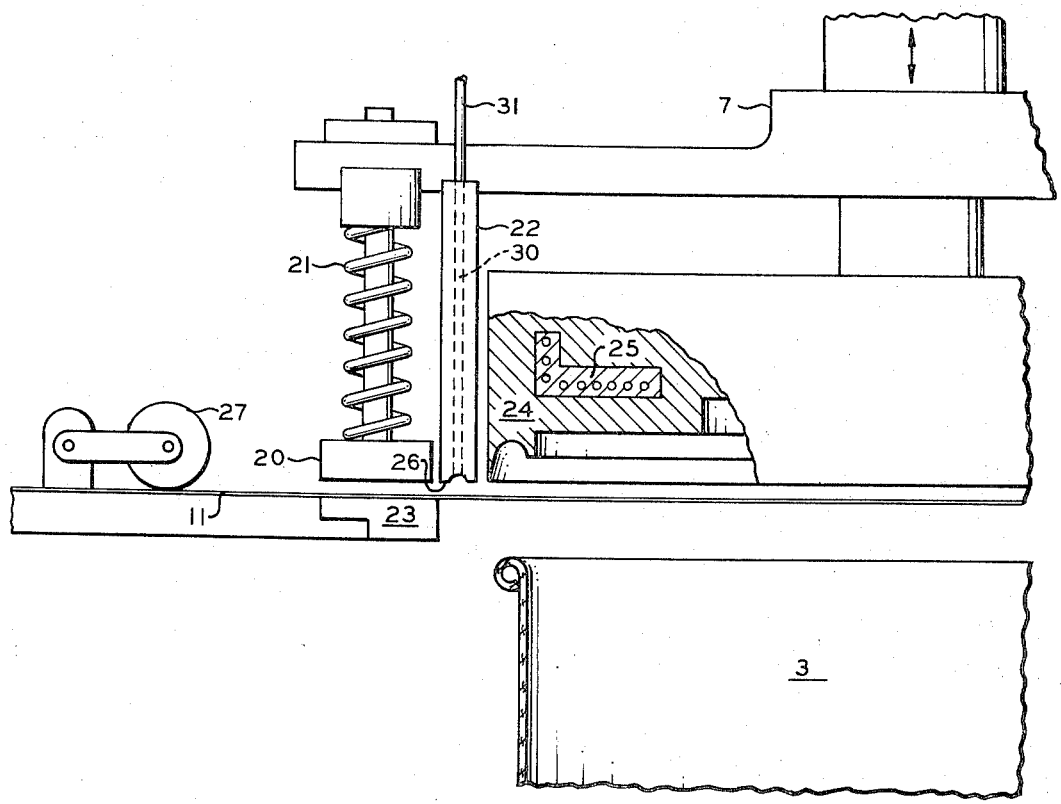
FIG. 3 is an enlarged view of a portion of the apparatus of FIG. 1 in a first position; and, FIG. 4 is an enlarged view of a portion of the apparatus of FIG. 1 in a second position.
Figure 4:
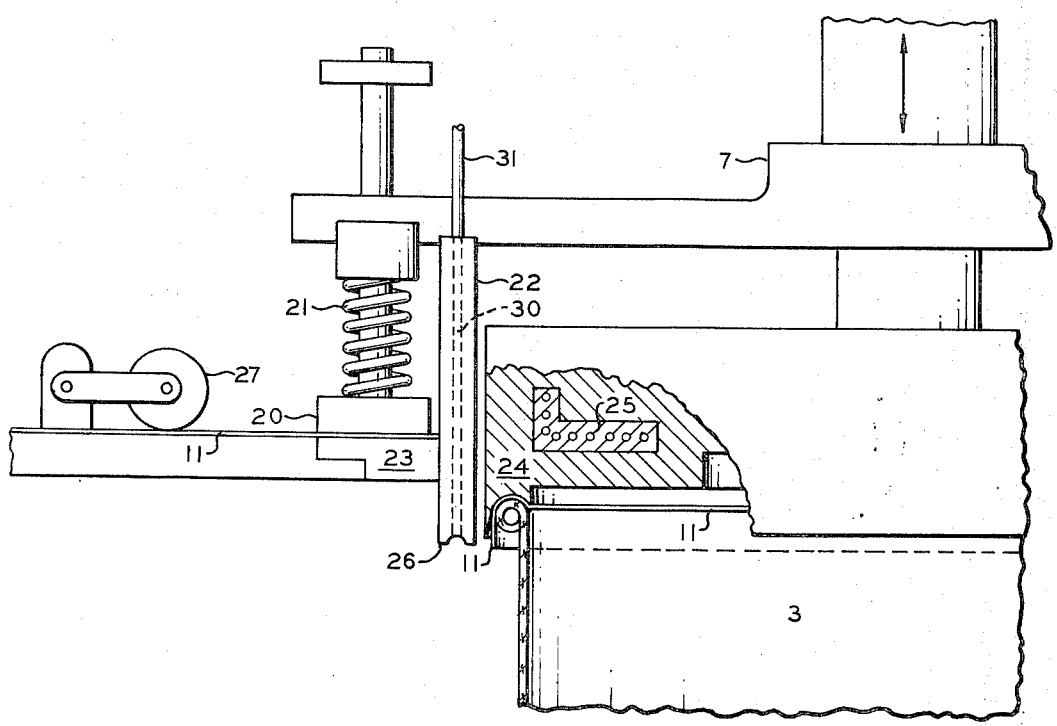

Positioned above the turret is a sealing head 7 which is depicted in greater detail in FIGS. 3 and 4.

Adapted to feed a film employed as the closure members for the container is any suitable film-feed system. This can be comprised of supply roll 10 feeding film 11 over guide roll 12 into contact with index roll 13 and between the sealing head and the container. In a similar manner, after the closure has been cut from the supply roll, the web scrap is collected on web scrap take-up roll 14.

Figure 2:
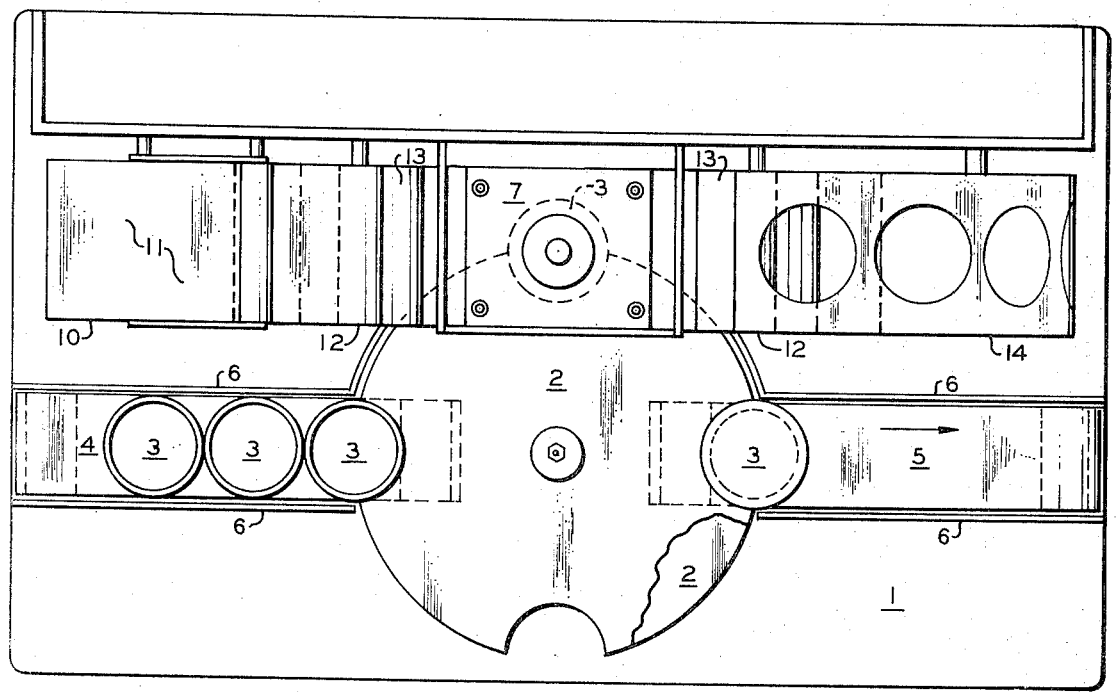
FIG. 2 is a plan view of the apparatus of FIG. 1.

FIG. 2 depicts a plan view of the apparatus as described in which like figures denote like elements.

In the operation of the apparatus, all movements of the apparatus can be driven from any number of power sources, with the various operations of the components being synchronized to operate as described.

The containers to be closed are fed by the in-feed conveyor onto the turret which sequentially indexes the containers beneath the film which is positioned under the sealing head.

Referring now to FIG. 3, there is shown a sectional view of the sealing head. It is adapted with film clamp 20 which is spring loaded by means of clamp spring 21. The sealing head is also adapted with a shear and transfer mechanism 22 which comprises a shearing element 26 penetrated by a conduit 30 through which a vacuum can be drawn by means of vacuum line 31. Shearing element 26 in conjunction with shear plate 23 acts as a shearing means which is employed to cut the film to the desired shape.

The sealing head is also adapted with forming element 24 which is formed to coincide with the configuration of the rim of the container. The forming element is heated to an elevated temperature, if desired, by means of heating element 25. It will be understood that the apparatus is adapted with a suitable plurality of such shearing and transfer mechanisms, film clamps and other elements as required for satisfactory performance.

The film is fed under film guide 27 and above the shear plate and across and above the container through the space under the sealing head. When the film is so positioned, the sealing head moves downward with the film clamp coming to bear on the film to retain it in a fixed position. Further downward motion of the head brings the shearing element into contact with the film such that the shearing element, acting in conjunction with the shear plate, cuts the film to the desired shape. A vacuum, drawn through the shearing element and the vacuum line, causes the film to be retained in contact with the shearing element as the sealing head continues to descend and to assume that position depicted in FIG. 4.

In that position depicted in FIG. 4, the forming element forces the film into contact with the rim of the container and into sealing relationship across to the opening of the closure. Simultaneously, the movement of the forming element detaches the film from the shearing element. The action of the forming element in effecting the sealing of the film to close the container can be that of a plurality of elements acting at a plurality of loci around the periphery of the container or it can be that of a single element adapted to pass over the circumference of the opening of the container, the film being positioned between the rotary-moving element and the rim of the container.

After positioning the film in closing relationship to the container for a suitable length of time, and for a time to allow a softening of the film if desired in order to facilitate sealing, the sealing head moves upwardly into that position shown in FIG. 3, and the film and a next unclosed container are indexed into position preparatory to the next cycle.

The apparatus as described above constitutes the best mode for practicing the invention in conjunction with a main drive having a continuously running motor coupled to a primary speed reduction means having an output of about 80 rpm. This, in turn, will feed a variable reduction means whereby the output from the apparatus is within the range of 25 to about 80 closures per minute.

The variable unit can be coupled to the in-feed and take-off conveyors through suitable means to provide about 10 inches of travel per revolution of variable reducer output. The output of the variable reducer can also be coupled to a suitable intermittent motion drive such as a Geneva drive mechanism for driving the turret and indexing feed rolls whereby the index motion is 120° of a cycle and dwell is 240°. In this embodiment, the sealing head is operated by a hydraulic cylinder which can be controlled by a cam operated valve, the cam being coupled to the output of the variable drive.

Filled containers can be fed by the in-feed conveyor which can be restricted to a travel of 10 inches of movement per cycle in order to deposit the containers properly on the turret. The feed rolls can be adapted to index in unison with the turret.

Suitable control means can be incorporated in the apparatus to energize the drive of the sealing head and to control the web indexing feed rolls. The feed of the web can be controlled by spaced holes positioned at the edges of the film web and being engaged by pins projecting from the indexing rolls.

The apparatus of this invention can be employed with or without the use of sealants between the rim of the container and the film. It can also be employed with films in which the sealing action of the apparatus permanently deforms the film to produce a detachable closure member which can be employed as a snap-off and snap-on closure.

It will be evident from the foregoing that various modifications can be made to both the method and apparatus of this invention. Such, however, are considered within the scope of the invention.

I claim:

1. Closure-applying apparatus comprising:
   a. positioning means for positioning a film over an open-ended container to be closed;
   b. shearing and retaining means in combination for shearing said film and for retaining the sheared film in contact with said shearing means, said shearing and retaining means being movably positionable to bring the sheared film into contact with the open end of said container;
   c. clamping means actuated in conjunction with said shearing and retaining means to hold said film in position during shearing;
   d. forming means for detaching said sheared film from said shearing means and for forming said sheared film in closing relationship with said container to close said container; and,
   e. means for removing the closed container from said apparatus.

2. The apparatus of claim 1 in which said shearing and retaining means comprises a shearing element adapted with vacuum means to maintain the sheared film in contact with said shearing means.

3. The apparatus of claim 1 in which said container is adapted with a rim around the periphery of its open end and said forming means is adapted to coincide with the configuration of said rim.

4. The apparatus of claim 1 in which said forming means is adapted with heating means to heat said forming means to an elevated temperature.

5. The apparatus of claim 2 in which said container is adapted with a rim around the periphery of its open end and said forming means is adapted to coincide with the configuration of said rim and said forming means is adapted with heating means to heat said forming means to an elevated temperature.

6. The apparatus of claim 1 in which said film is positioned over said container from a supply roll and said container is positioned on a rotary type feed unit.

7. The apparatus of claim 1 in which the shearing of said film produces a web scrap and said apparatus comprises a web scrap take-up roll for accumulating said web scrap.

8. The apparatus of claim 2 in which said shearing and retaining means comprises a shear plate positioned beneath said film.

9. The apparatus of claim 5 in which said container is adapted with a rim around the periphery of its open end and said forming means is adapted to coincide with the configuration of said rim, said forming means being adapted with heating means to heat said forming means to an elevated temperature, said forming means comprising a single element, and in which said film is positioned over said container from a supply roll and said container is positioned on a rotary-type feed unit and in which the shearing of said film produces a web scrap and said apparatus is adapted with a web scrap take-up roll for accumulating said web scrap and in which said shearing and retaining means comprises a shear plate beneath said film.

* * * * *